(12) United States Patent
Ryan et al.

(10) Patent No.: US 11,055,293 B2
(45) Date of Patent: Jul. 6, 2021

(54) IMPLEMENTING A USER ENGAGEMENT PLATFORM USING A DATABASE SYSTEM

(71) Applicant: Salesforce.com, Inc., San Francisco, CA (US)

(72) Inventors: Joseph David Ryan, San Francisco, CA (US); Adam McCormick Doti, Petaluma, CA (US); Lila Jane Lancaster Giuili, San Francisco, CA (US); Justin Zachary Spadea, San Francisco, CA (US); Ruchi Agarwal, San Francisco, CA (US); Nithyanandniranjan Chandarraj, San Francisco, CA (US); Varun Suhas Deshpande, San Francisco, CA (US)

(73) Assignee: Salesforce.com, Inc., San Francisco, CA (US)

(*) Notice: Subject to any disclaimer, the term of this patent is extended or adjusted under 35 U.S.C. 154(b) by 79 days.

(21) Appl. No.: 16/201,267

(22) Filed: Nov. 27, 2018

(65) Prior Publication Data

US 2020/0097477 A1 Mar. 26, 2020

Related U.S. Application Data

(60) Provisional application No. 62/735,318, filed on Sep. 24, 2018.

(51) Int. Cl.
*G06F 16/2457* (2019.01)
*G06F 16/248* (2019.01)
*G06Q 30/00* (2012.01)
*G06F 9/451* (2018.01)
(Continued)

(52) U.S. Cl.
CPC ........ *G06F 16/24575* (2019.01); *G06F 9/453* (2018.02); *G06F 16/248* (2019.01); *G06Q 30/01* (2013.01); *G06Q 50/01* (2013.01); *G06F 3/0482* (2013.01)

(58) Field of Classification Search
CPC .. G06F 16/24575; G06F 16/248; G06F 9/453; G06F 3/0482; G06F 16/2457; G06Q 30/01; G06Q 50/01
See application file for complete search history.

(56) References Cited

U.S. PATENT DOCUMENTS 9,798,813 B2 10/2017 Walters et al.
2006/0277213 A1* 12/2006 Robertson ........... H04L 63/0263
(Continued)

*Primary Examiner* — Cam Y T Truong
(74) *Attorney, Agent, or Firm* — Kwan & Olynick LLP

(57) ABSTRACT

A user engagement platform may be maintained in association with an application or service. The user engagement platform may be configurable to provide user engagement content to users of the application or service. A request to perform an operation on first user engagement content may be received from an authorized administrator. The first user engagement content may be configurable by the authorized administrator to be automatically provided to users of the application or service in response to occurrence of a first event. The operation may be performed on the first user engagement content. It may be determined that the first event has occurred in association with a first user of the application or service. The first user engagement content may be caused to be displayed on a device of the first user.

16 Claims, 10 Drawing Sheets

(51) Int. Cl.
*G06Q 50/00* (2012.01)
*G06F 3/0482* (2013.01)

(56) References Cited

U.S. PATENT DOCUMENTS

| | | | |
|---|---|---|---|
| 2008/0060007 A1* | 3/2008 | Matsubayashi | H04N 21/4826 725/39 |
| 2014/0337436 A1* | 11/2014 | Hoagland | G06F 16/9535 709/204 |
| 2015/0019480 A1* | 1/2015 | Maquaire | G06F 16/23 707/609 |
| 2016/0098667 A1 | 4/2016 | Ryan | |
| 2016/0104067 A1 | 4/2016 | Xu et al. | |
| 2017/0024765 A1* | 1/2017 | Barenholz | G06Q 30/0255 |
| 2018/0253195 A1 | 9/2018 | Van Osten et al. | |

\* cited by examiner

IMPLEMENTING A USER ENGAGEMENT PLATFORM USING A DATABASE SYSTEM

CROSS-REFERENCE TO RELATED APPLICATIONS

This patent document claims priority to Provisional U.S. Patent Application No. 62/735,318 (A4137PROV_SFDCP004P) by Doti et al., titled "IMPLEMENTING A USER ENGAGEMENT PLATFORM USING A DATABASE SYSTEM," filed Sep. 24, 2018. Provisional U.S. Patent Application No. 62/735,318 is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever

FIELD OF TECHNOLOGY

This patent document relates generally to database systems and more specifically to implementing a user engagement platform using a database system.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

BRIEF DESCRIPTION OF THE DRAWINGS

The included drawings are for illustrative purposes and serve only to provide examples of possible structures and operations for the disclosed inventive systems, apparatus, methods and computer program products for implementing a user engagement platform using a database system. These drawings in no way limit any changes in form and detail that may be made by one skilled in the art without departing from the spirit and scope of the disclosed implementations.

DETAILED DESCRIPTION

Figure 1:
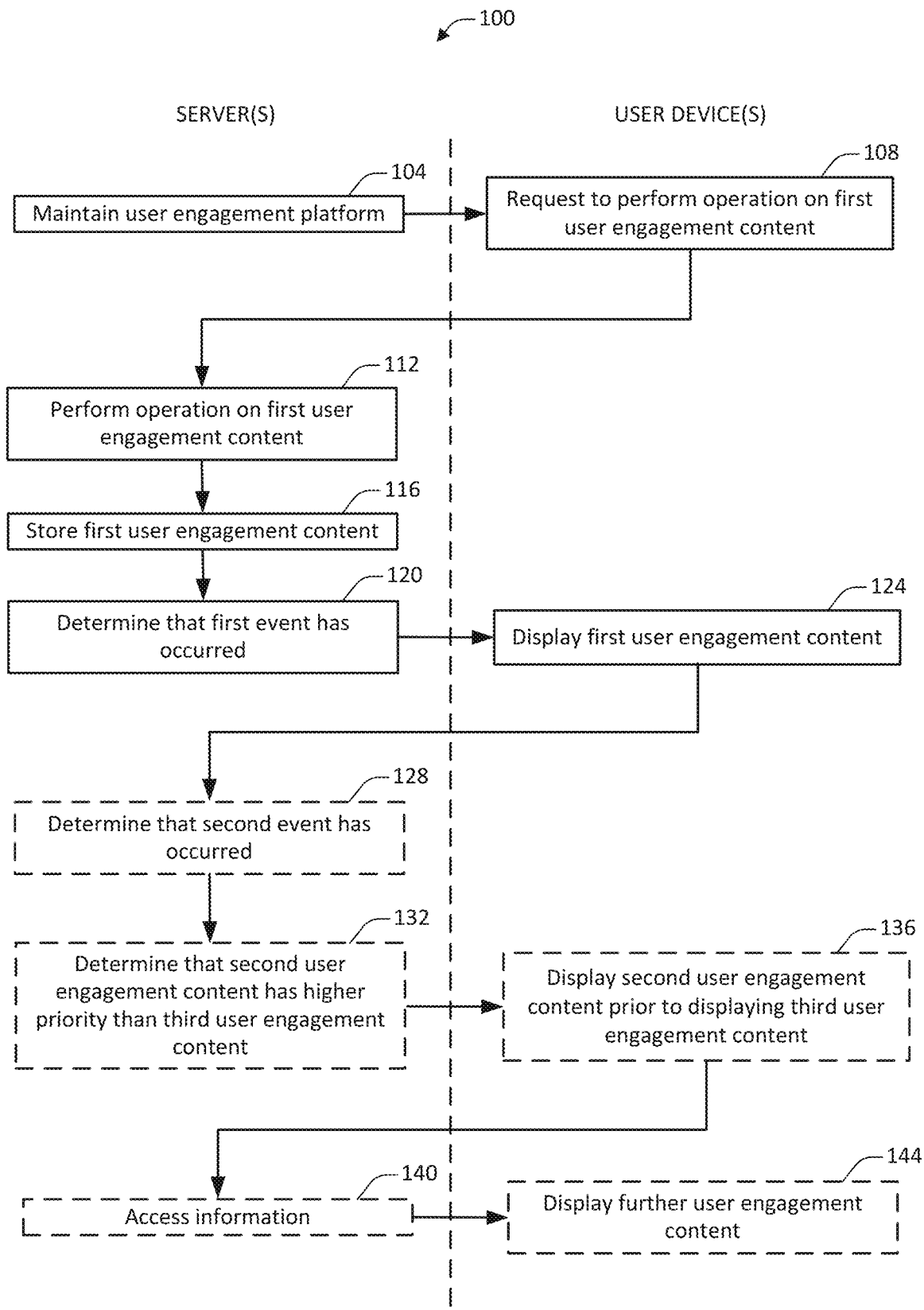
FIG. 1 shows a flowchart of an example of a method for implementing a user engagement platform, performed in accordance with some implementations.

Some implementations of the disclosed systems, apparatus, methods and computer program products are configured for implementing a user engagement platform. As described in further detail below, such a user engagement platform may provide explanatory information relating to use of any application or service such as a Customer Relationship Management (CRM) Platform. By way of example, as described below, such a user engagement platform may serve to provide user engagement content to users interacting with Lightning Experience® provided by salesforce.com, inc. As used herein, the term "user engagement content" refers to any explanatory information relating to use of an application or service. Examples of such user engagement content are discussed in further detail below. While CRM platforms are discussed herein as an example of an application or service, one having skill in the art can appreciate that the user engagement platforms described herein can be implemented to provide explanatory content related to any application or service such as a CRM platform, a learning platform, a social networking system, any type of consumer or business software, etc.

Conventional user engagement strategies can be inflexible, leading to ineffective and inefficient use of applications or services. By way of illustration, Wuthering Lights, a multinational corporation specializing in the sale of candles, is implementing a traditional Customer Relationship Management (CRM) platform, which provides conventional user engagement content. Such user engagement content includes pre-made help menus which relate to general sales, which is ineffective for Wuthering Lights employees because such content is irrelevant to candle market. As such, Catherine, the Chief Executive Officer (CEO) of Wuthering Lights, must generate her own user engagement content, separate from her CRM platform, to provide to her employees, wasting valuable time and effort and leading to user engagement content that is not well integrated into the CRM platform.

By contrast, some of the disclosed techniques can be used to allow organizations to easily generate and modify user engagement content that is integrated with an application or service. Returning to the above example, Catherine, as an authorized administrator using Lightning Experience®, can use the disclosed techniques to create unique on-boarding experiences, covering many important candle-related topics, to be automatically provided to all new employees of Wuthering Lights when they log into Lightning Experience® for the first time. Additionally, Catherine can eliminate any pre-made user engagement content that is irrelevant to the candle market. Furthermore, the user engagement content generated by Catherine can be presented to her employees seamlessly as they interact with Lightning Experience®.

Unlike conventional user engagement strategies, user engagement content can be intelligently displayed to a user in a manner that is adaptable based on the user's behavior in the application or service. By way of example, as described below, user-specific metrics may be used to measure Nelly's behavior as she interacts with user engagement content and with a CRM platform. Similarly, global data that includes events associated with all users of the CRM platform may be logged and stored offline. As discussed in further detail below, such user-specific metrics and global data may serve as training data to inform a predictive algorithm, which may be used to determine an effective type and timing of user engagement content to be presented to Nelly.

In some implementations, the disclosed techniques can be used to prevent a user from being exposed to an overwhelming amount of user engagement content at the same time. By way of illustration, a user engagement content controller, as described in further detail below, can be employed to automatically manage the timing of when a user is presented with user engagement content. For instance, Heathcliff, a salesman at Wuthering Lights, clicks a button to create a new case for the first time. The event of clicking the "new case" button triggers a wealth of user engagement content explaining the creation of a new case to a user. To avoid Heathcliff being presented with too much information at a time, a user engagement content controller automatically weighs and prioritizes the user engagement content triggered by Heathcliff's clicking of the new case button, presenting Heathcliff with the most important user engagement content first and, after a certain period of time, continuing to present him with other relevant user engagement content one piece at a time.

FIG. 1 shows a flowchart of an example of a method 100 for implementing a user engagement platform, performed in accordance with some implementations. FIG. 1 is described in the context of FIGS. 2-7. FIGS. 2-6 show examples of Graphical User Interfaces (GUIs), in accordance with some implementations. FIG. 7 shows a block diagram of an example of a user engagement content management system, in accordance with some implementations.

At 104 of FIG. 1, a user engagement platform is maintained. By way of example, the user engagement platform may be maintained in association with an application or service, such as a CRM platform, using a multi-tenant database system. For instance, the user engagement platform may be implemented in an environment such as environment 810 of FIG. 8, as described below. By way of illustration, the user engagement platform may be provided in conjunction with a CRM platform to a variety of tenant organizations such as Wuthering Lights, using the techniques described below in the context of FIGS. 8-10. The user engagement platform may be configurable to provide user engagement content to users of the CRM platform. By way of example, as described below, an authorized administrator at Wuthering Lights can generate, modify, retrieve, or delete, user engagement content related to use of the CRM platform, which may be exclusively available to users from the Wuthering Lights organization.

At 108 of FIG. 1, a request to perform an operation on user engagement content is processed. Such an operation may include any operation such as generating the first user engagement content, retrieving the first user engagement content, modifying the first user engagement content, or deleting the first user engagement content.

A user may request to perform an operation on user engagement content in a variety of manners. By way of example, Catherine, an authorized administrator at Wuthering Lights, may request to generate user engagement content via set-up assistant 200 of FIG. 2. Catherine may click or tap role menu 204 to select her role as "authorized administrator." She may then click or tap next button 208, at which point she may be presented with a GUI for generating, modifying, retrieving, or deleting user engagement content.

Figure 2:
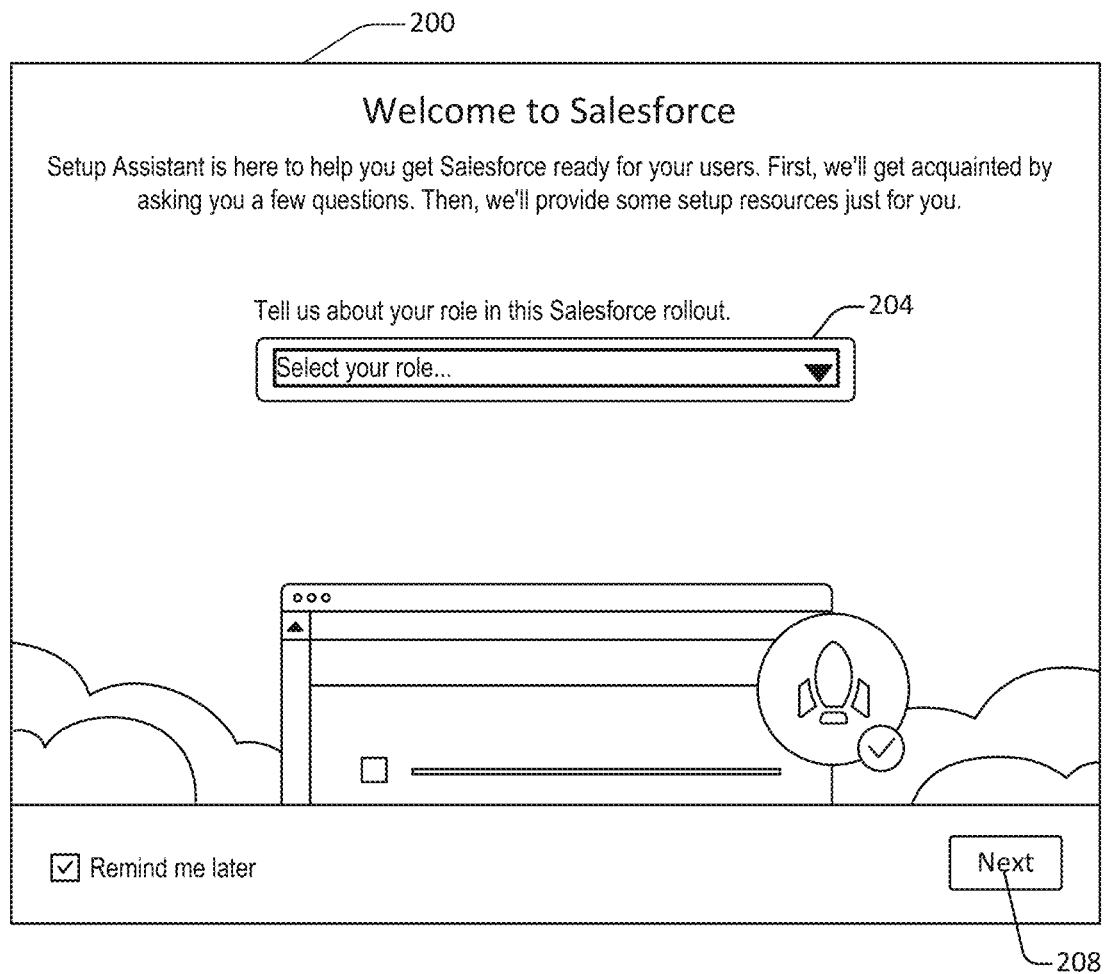
FIGS. 2-6 show examples of Graphical User Interfaces (GUIs), in accordance with some implementations.
Figure 3:
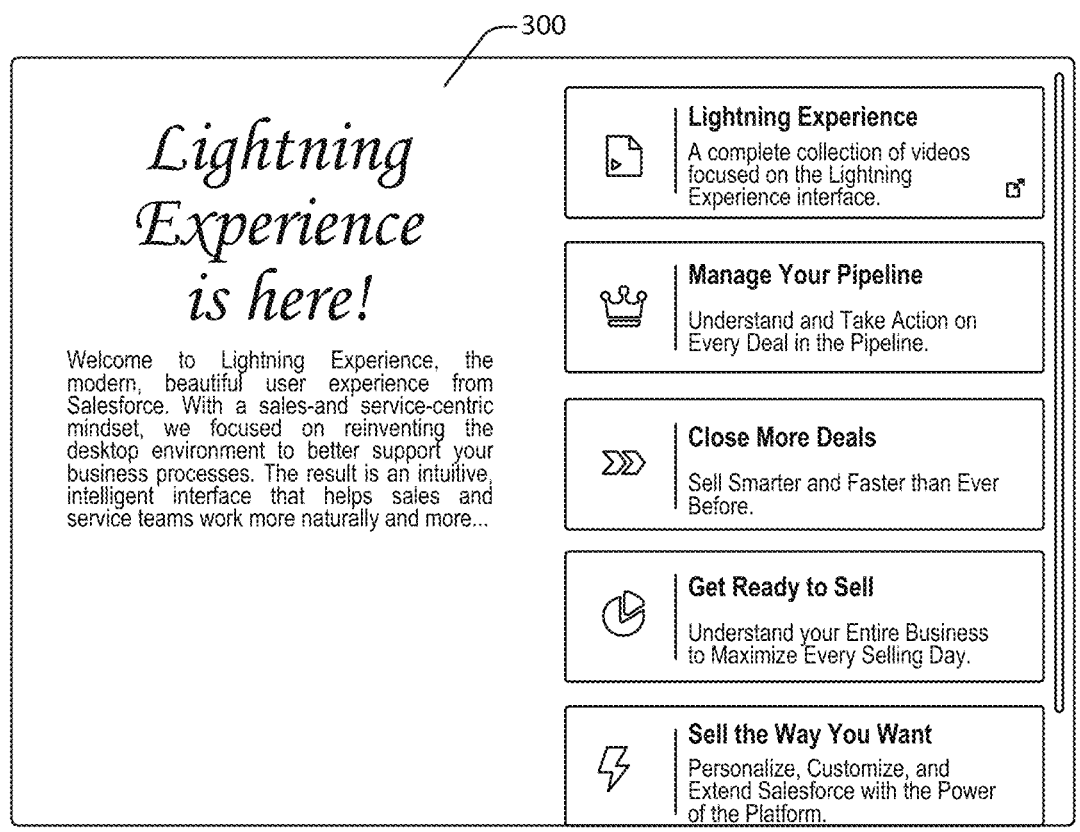
Figure 4:
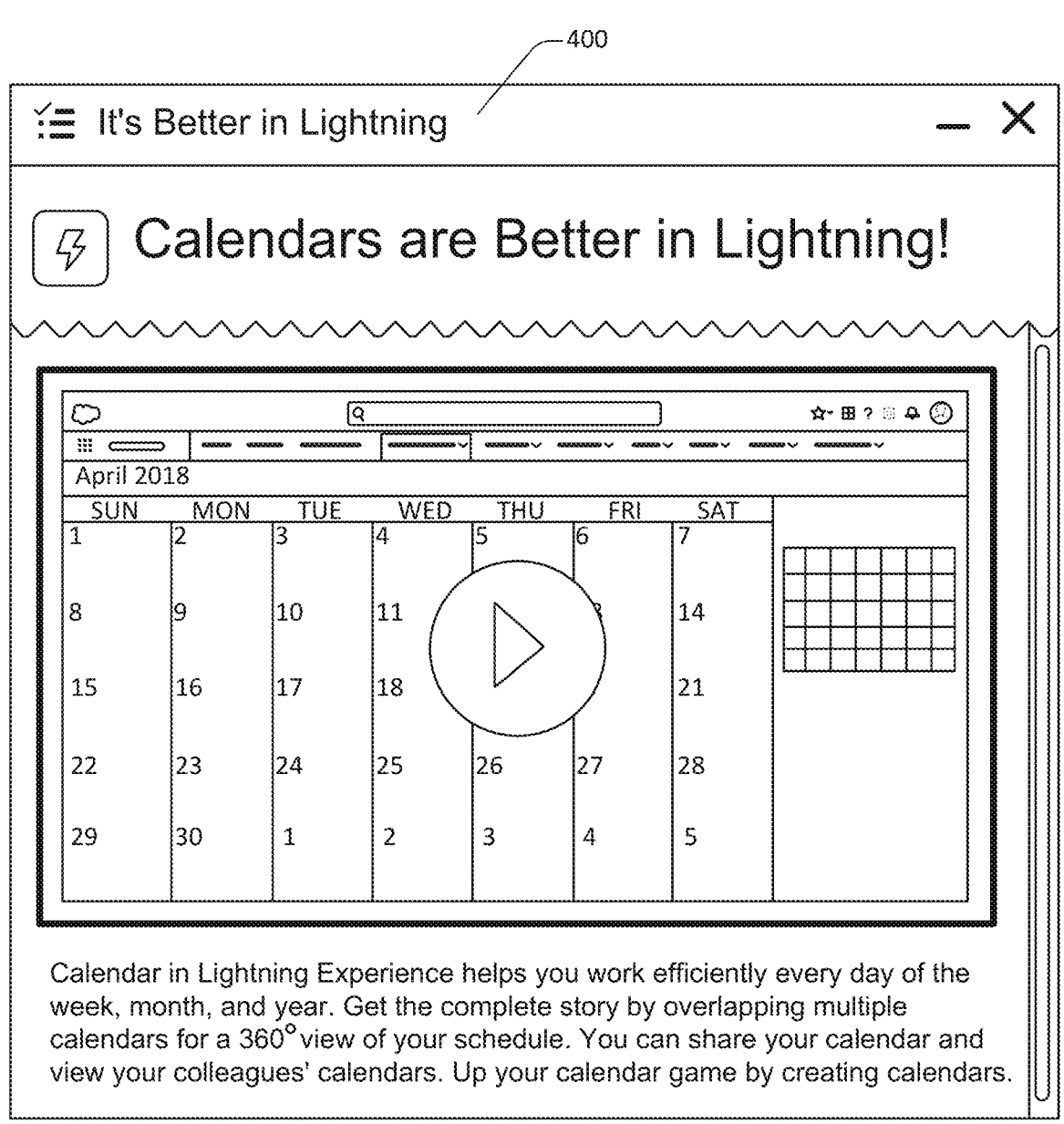

Alternatively, rather than being used to generate, retrieve, modify, or delete user engagement content, a set-up assistant, such as set-up assistant 200 of FIG. 2, may be a type of user engagement content, which is customizable using the disclosed techniques. By way of illustration, Catherine may configure set-up assistant 200 to provide different user engagement content to a variety of groups of users based on their role in the application or service. In addition, users in the Wuthering Lights organization may be prompted to self-select a particular role in order to opt themselves into various "tracks" of user engagement. By way of illustration, Linton may self-select as a "sales aficionado." Therefore, Linton may receive special user engagement content that Catherine configures specially for users having the role of sales aficionado.

In some implementations, in order to perform generation, modification, retrieval, or deletion of user engagement content, Catherine may not be required to indicate her role as "authorized administrator." By way of example, as discussed below, "permissions" may be stored in a database of a multi-tenant database system. Catherine's permissions may indicate that, as an authorized administrator, she has permission to generate, retrieve, modify, or delete user engagement content. As such, Catherine may merely click or tap a button for generating, retrieving, modifying, or deleting user engagement content. In response to Catherine pressing the button, a database system may check Catherine's permissions and determine that she has permission to generate, retrieve, modify, or delete user engagement content. Accordingly, she may then be presented with a graphical user interface for generating, modifying, retrieving, or deleting user engagement content.

Catherine may configure user engagement content such that the user engagement content is automatically provided to users on occurrence of a particular event such as clicking of a button, loading of a page, scrolling of a page etc. By way of example, when generating a "Welcome Aboard Presentation," containing user engagement content related to onboarding new employees, Catherine may select the Welcome Aboard Presentation to be automatically provided to a user when he or she logs into the CRM platform for the first time. In another example, Catherine may generate user engagement content relating to a new button in the CRM platform, which she selects to be automatically provided to a user when he or she clicks the new button. Catherine may request to modify, retrieve, or delete any user engagement content that she, or another administrator from Wuthering Lights, has previously generated.

As described above, user engagement content can include any explanatory information relating to use of an application or service. By way of illustration, user engagement content can include a "welcome mat" modal (also referred to as an "onboarding" modal) such as modal 300 of FIG. 3, which may be presented to a user when he or she logs into an application or service. Also or alternatively, user engagement content may include an onboarding presentation such as onboarding presentation 400 of FIG. 4. The onboarding presentation 400 may be used to automatically display onboarding content for any new user when he or she first logs into an application or service.

Figure 5:
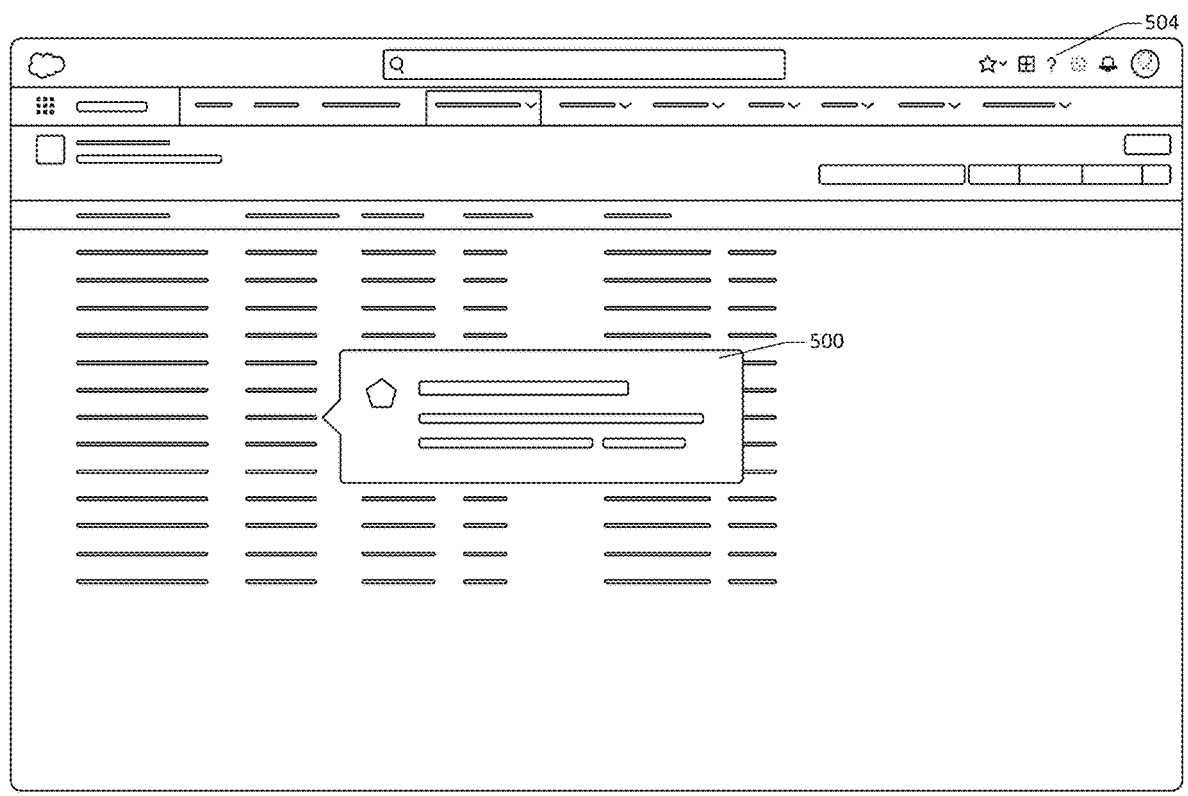

In some implementations user engagement content may include a feature popover, such as feature popover 500 of FIG. 5. Feature popovers may explain specific functionality of a feature of an application or service or point a user to a particular region of the user interface that may be of interest.

In some implementations, such feature popovers may be displayed to a user as a sequence of prompts that teach a few basic actions to the user.

Figure 6:
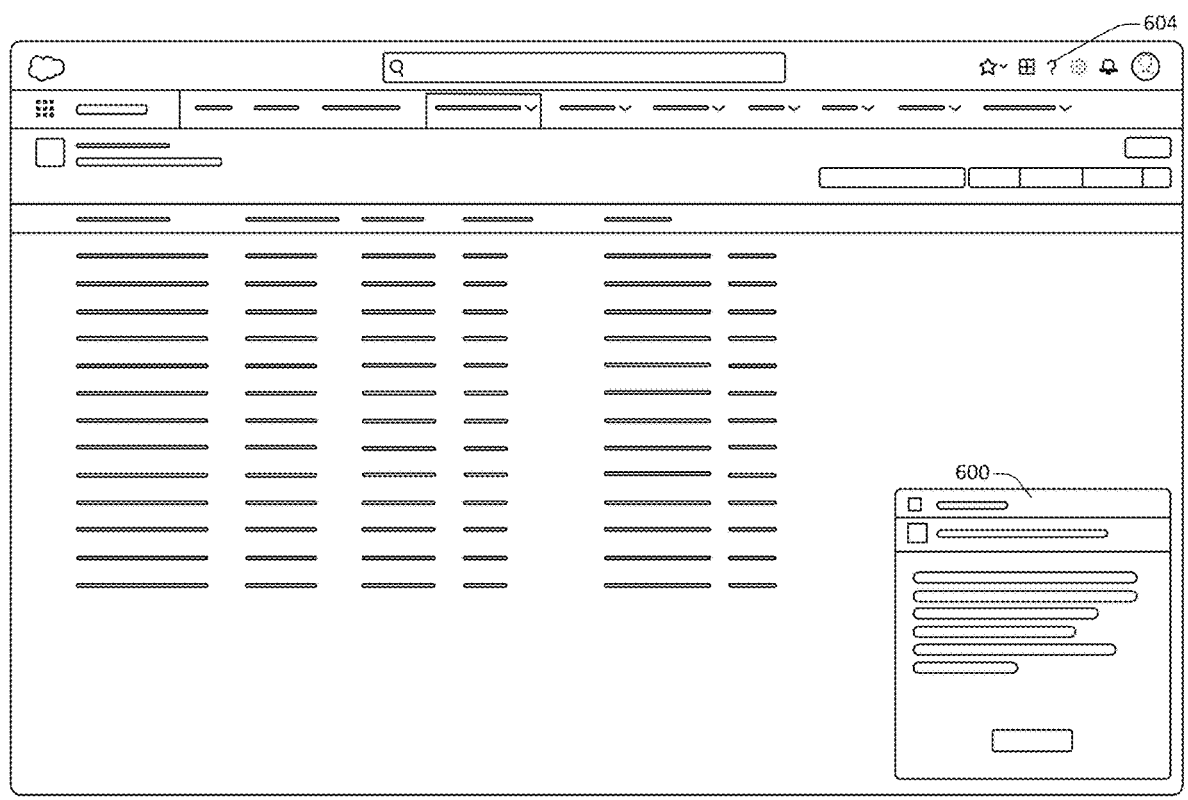
Figure 7:
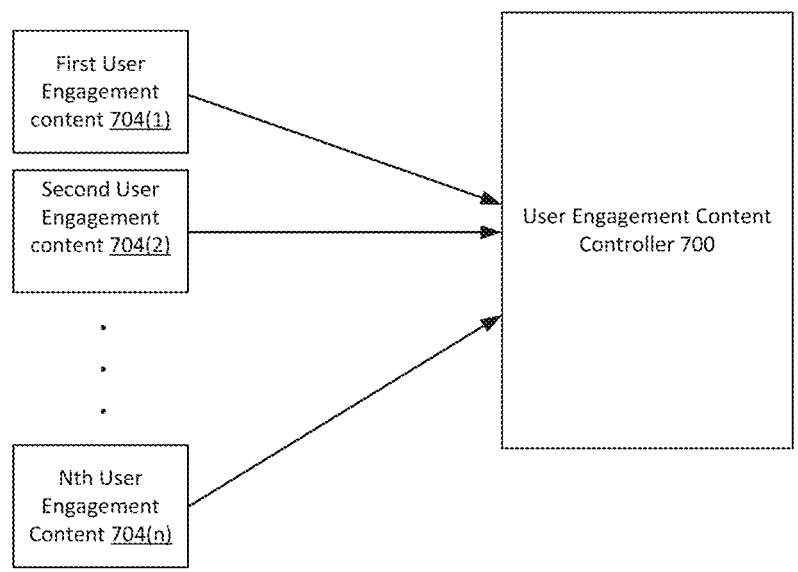
FIG. 7 shows a block diagram of an example of a user engagement content management system, in accordance with some implementations.

Also or alternately, user engagement content may include a docked panel, such as docked panel 600 of FIG. 6. A docked panel may remain docked to a user's viewport as he or she navigates around an application or service. Such a docked panel may show a variety of information, such as a video thumbnail, blurb of text, or step-by-step instructions to follow. A user may continue clicking around the screen as the panel floats on top or the panel may be minimized.

As discussed in detail below, user engagement content may also include any content or links included in a help menu. Such a help menu may be accessible by clicking or tapping a button or menu selection in the user interface of the application or service such as buttons 504 and 604 of FIGS. 5 and 6.

User engagement content is not limited to the examples described above, for example such user engagement content may include any instructional message related to use of an application or service. User engagement content may also include content related to a "walkthrough," which is an interactive demonstration of a feature or features of an application or service. Also or alternatively, user engagement content may include any type of learning content from a learning platform.

At 112 of FIG. 1, the operation requested at 108 is performed. By way of example, in response to Catherine's request to create the Welcome Aboard Presentation described above, a database system implementing the user engagement platform may cause the Welcome Aboard Presentation to be created.

At 116 of FIG. 1, the user engagement content is stored. By way of example, in response to the Welcome Aboard Presentation being created at 112, the Welcome Aboard Presentation may be stored in tenant data for the Wuthering Lights organization. For instance, user engagement content, such as the Welcome Aboard Presentation, may be stored in tenant data storage 822 of database system 816 of FIG. 8, discussed in further detail below.

At 120 of FIG. 1, it is determined that a first event has occurred. The first event may include any event, the occurrence of which triggers the automatic provision of user engagement content. As described above, occurrence of such an event may include a variety of occurrences such as, loading a page, clicking a button, logging into an application or service, hovering a mouse curser over a feature of an application or service, etc. By way of example, it may be determined at 120 that Lockwood, a new employee of Wuthering Lights, has on-boarded and opened up a CRM platform for the first time.

At 124 of FIG. 1, user engagement content is displayed. By way of example, in response to determining that that Lockwood has opened up the CRM platform for the first time, Catherine's Welcome Aboard presentation may be displayed on Lockwood's computing device.

At 128 of FIG., it is determined that a second event has occurred. By way of example, it may be determined that Lockwood has opened his first new case. The opening of a new case triggers the presentation of a "new case bubble" reminding users to perform certain required tasks that are to be completed whenever a new case is opened. Similarly, the first time a user opens a new case, he or she is presented with a "welcome to new cases tutorial," which is a customized tutorial designed by Catherine, which explains very basic information related to opening a new case. As such, Lockwood opening his first new case corresponds to the presentation of two pieces of user engagement content: the new case bubble and the welcome to new cases tutorial.

At 132 of FIG. 1, it is determined that some user engagement content, such as the welcome to new cases tutorial, has a higher priority than other user engagement content, such as the new case bubble. By way of example, a user engagement controller 700 may process first user engagement content 704(1), second user engagement content 704(2), up to any arbitrary number nth user engagement content 704(n) that is to be presented to a user at the same time or at nearly the same time. The User Engagement Content Controller 700 may apply user engagement rules to assign priority to each of the user engagement content 704(1)-(n). The User Engagement Content Controller 700 may then determine that particular user engagement content has higher priority than other user engagement content by comparing the priority assigned to the particular user engagement content to the priority assigned to the other engagement content has higher priority. As described further below, such user engagement rules may have a user-specific component that adjusts how and when user engagement content is presented to a particular user based on his or her behavior.

In some implementations, user engagement rules used to assign priority to user engagement content may be configurable and/or modifiable by an authorized administrator. By way of example, Catherine may choose for all customized user engagement content that she has created to have priority over any pre-made user engagement content. Also or alternatively, such user engagement rules may involve a simple hierarchy. By way of example, welcome mats may have the highest priority of all user engagement content; a docked panel may have the second highest priority; and so on and so forth.

The User Engagement Content Controller 700 can process user engagement content 704(1)-(n) causing the user engagement content 704(1)-(n) with the highest priority to be displayed to a user prior to a time delay (e.g., 30 seconds, one minute, half an hour, etc.) After such a time delay, the User Engagement Controller 700 can cause the user engagement content 704(1)-(n) with the second highest priority to be displayed to the user followed by another time delay. And so on and so forth until the user engagement content 704(1)-(n) with the nth highest priority is displayed to the user. As described below, some of the user engagement content 704(1)-(n) may not be relevant to a particular user and, therefore, may not be displayed to him or her at all. In some implementations, the user engagement content controller 700 may determine how and/or when to display user engagement content based on a variety of global data and/or user-specific metrics as well as the user engagement rules described above. By way of example, user-specific metrics relating to how a particular user responds to various types of user engagement content can be measured. Predictive analytics can be applied to the user-specific metrics determine how and/or when to effectively display user engagement content to particular users or particular types of users. Such user-specific metrics may include a variety of information including, but not limited to, the following: whether a user engages with user engagement content, what types of user engagement content a user engages with, how much time a user spends engaging with user engagement content, how users respond to different types and/or quantities of user engagement content, a type of device a user is using to interact with the application or service (e.g., a smartphone, a tablet, a laptop or desktop computer, a wearable device etc.), whether and how often a user interacts with a feature of the application or service, a user's behavior in an external platform (e.g., a learning platform such as Trailhead®), etc. As discussed below, such user-specific metrics may be provided to various entities such as authorized administrators. In addition to user-specific metrics which are tracked on a user-level, all events in the application or service may be globally logged to create global data. Such global data may be recorded for all users across all organizations implementing the application or service.

One with skill in the art can appreciate that user-specific metrics and/or global data may include a variety of further information than the examples described above. By way of illustration, user-specific metrics and/or global data may include a full historical tracking of each user's history of engagement with user engagement content (e.g., a record of the user engagement content that has been presented to each user and the time/date on which such user engagement content has been presented to each user). Such a full historical tracking may support a curriculum and learning path system that may be centrally managed by the application or service and/or a tenant organization implementing the application or service. By way of example, the full historical tracking may be automatically cross-checked for the purpose of ensuring compliance with training goals that relate to the consumption of user engagement content.

Also or alternatively, user-specific metrics and/or global data may include a record of the types of user engagement content that have been presented to users of the application or service as well as measurements of the effectiveness of each type of user engagement content across applicable audiences. Such measurements may be used to optimize the effectiveness of user engagement content such that users are only shown particular types of user engagement content, which are likely to be effective. By way of example, user engagement content can be optimized for particular audience segments, and presented in ways that drive the highest engagement in that audience segment.

In some implementations, user-specific metrics and/or global data may include a record of which versions of user engagement content have been presented and their respective metrics. As such, user-specific metrics and/or global data may be used for automated testing of different versions of user engagement content to different audiences.

In some implementations, user-specific metrics may include a per-user score of engagement level with user engagement content, which may be linked to usage of specific features of the application or service. By way of example, by measuring the timing of a user's consumption of user engagement content and subsequent use of a particular feature, it can be estimated whether consumption of the user engagement content has contributed to use of the particular feature. By way of illustration, Heathcliff may learn about a new sales feature via user engagement content, and several minutes later he may begin using the new sales feature, indicating that learning about the new sales feature via the user engagement content may have cause him to use the new sales feature. In a similar example, Nelly may sometime use an automated sales logger feature. She may be presented with user engagement content relating to the automated sales logger. After consuming the user engagement content, Nelly may begin using the automated sales logger much more often, indicating that the user engagement content may have caused her to use the automated sales logger more frequently. In some implementations, predictive analytics can be applied to such user-specific metrics and global data to determine how and/or when to effectively present user engagement content to a particular user. By way of illustration, it may be determined based on his user-specific metrics that Heathcliff is a sales user. Based on the global data it can be determined that sales users generally prefer to engage with particular user engagement content. As such, the particular user engagement content can be displayed on Heathcliff's computing device. Similarly, it may be determined that Nelly is a software engineer based on Nelly's user-specific metrics. Based on the global data it can be determined that software engineers generally prefer not to engage with the particular user engagement content. As such, the particular user engagement content may not be displayed to Nelly.

Along the same lines, in some implementations, a user's unique behavior may be used to determine how and/or when to effectively present user engagement content to the user. By way of illustration, Heathcliff's user-specific metrics may indicate that he rarely watches training videos but frequently completes walkthroughs. As such, when possible, user engagement content may be presented to Heathcliff in the form of walkthroughs rather than videos.

One having skill in the art can appreciate that the use of predictive analytics to determine how and/or when to display user engagement content can be achieved in an array of manners. By way of example, a variety of predictive models such as a machine learning algorithm, Bayesian statistical inference, or frequentist statistical inference may be applied. By way of illustration, user-specific metrics and/or global data may be used as training data in a machine learning model such as a random forest model. The model may then be used to predict how and/or when to display user engagement content to particular users or particular types of users based on the training data, as described above.

In some implementations, some user-specific metrics and/or global data may be provided to a variety of entities. By way of example, some user-specific metrics and/or global data may be provided to an authorized administrator. He or she may analyze the user-specific metrics and/or global data to determine how his or her customized user engagement strategy can be improved. Also or alternatively, some user-specific metrics and/or global data may be provided to product manager of the application or service to determine how users interact with certain features of the application or service, and how such features can be improved.

Returning to FIG. 1, at 136, higher priority user engagement content is displayed prior to the lower priority user engagement content. By way of example, responsive to a determination at 132 that the welcome to new cases tutorial has a higher priority than the new case bubble, the welcome to new cases tutorial may be displayed on Lockwood's computing device. After Lockwood has completed the welcome tutorial, there may be a time delay after which the new case bubble may be displayed on Lockwood's computing device.

In some implementations, different user engagement content may be presented to a user depending on what type of device the user is using to interact with the application or service By way of example, as described above, Lockwood's behavior in interacting with the application or service across his various devices may be recorded, and user engagement content may be displayed to him with differing form and/or content based on user-specific metrics and/or global data. By way of illustration, when Lockwood logs into the CRM platform using his desktop computer, he may receive a prompt to perform a certain task that he typically performs using his desktop computer. On the other hand, if Lockwood accesses the CRM platform using a mobile device, he may not receive the same prompt. Rather, he may receive different types of prompts that relate to his typical behavior when interacting with the application or service using a mobile device.

As discussed above, user engagement content may be displayed in the form of a particular type of user engagement content based on global data and/or user-specific metrics as described above. By way of example, the user engagement content controller 700 of FIG. 7 may determine, using the techniques described above, that Lockwood responds best to docked panels. As such, the content of new case bubble may be displayed on Lockwood's computing device in the form of a docked panel.

At 140 of FIG. 1, information from a learning platform is accessed. By way of example, Wuthering Lights may use a learning platform, such as Trailhead® provided by salesforce.com, inc, to train its users in using a CRM platform. Behavior of a user in the learning platform, e.g. how much training he or she has completed, may indicate how much user engagement content will be helpful in helping her to use the CRM platform. By way of Example, Heathcliff may not have completed any training in whereas Isabella may have completed every training exercise available to her. As such, it may be beneficial for Heathcliff to be presented with user engagement content more frequently than Isabella.

At 144 of FIG. 1, user engagement content is displayed based on the information from the learning platform. By way of illustration, returning to the example of the preceding paragraph, Heathcliff may be presented with extra user engagement content relating to a feature for which he has not completed any training in the learning platform. Additionally, Heathcliff may be presented with a message in association with the extra user engagement content stating: "Heathcliff, you are behind on your training, please go to Trailhead® to learn more." On the other hand, Isabella may not be presented with the extra user engagement content because she has already completed training in the learning platform relating to the feature.

In some implementations, a help menu may contain a section which allows a user to re-engage with user engagement content that he or she has not yet finished consuming. By way of illustration, Nelly is in the process of reading a prompt which explains a new feature in a CRM platform. Nelly receives an important phone call in the midst of reading the information in the prompt. In order to take the phone call, Nelly closes the prompt before finishing reading its content. When Nelly closes the prompt, Nelly's progress in reading the prompt can be stored. When Nelly wishes to finish reading the content of the prompt, she can click or tap a link in the help menu, causing her to be presented with the prompt at the place she left off when she closed the prompt.

Also or alternatively, a help menu may be customizable by an authorized administrator of an organization. By way of example, Catherine may turn off some or all pieces of pre-made content. In another example, Catherine may generate her own help menu links and content or modify existing help menu links and contents using the techniques described above in the context of 104-416 of FIG. 1.

In some implementations, help menu content may be turned on or off for specific users or users having a certain role or persona. Also or alternatively, if a user has engaged with a certain feature, a help menu may contain specific user engagement content relating to that feature, whereas if another user has never engaged with the feature his or her help menu may not contain the specific user engagement content relating to the feature.

In some implementations, user engagement content relating to a feature may be displayed in a user's help menu based on whether the user has access to the feature. By way of illustration, the "premium analytics button" is only available to users of the CRM platform that have a "premium license." Neither Heathcliff nor the Wuthering Lights organization has a premium license. As such, Heathcliff's help menu may not contain user engagement content relating to the premium analytics button. In another example, as head of sales at Wuthering Lights, Isabella has access to the "aggregate sales button," which is only available to users having certain roles. Since Isabella has access to the aggregate sales button, her help menu may contain user engagement content relating to the aggregate sales button. Also or alternatively, a help menu may allow users to navigate to user engagement content that he or she may be shown in the future. By way of example, Heathcliff may have completed a walkthrough relating to a particular feature of the CRM platform. Since Heathcliff has completed the walkthrough, he may be ready for more advanced user engagement content relating to particular details of the feature. While Heathcliff may be automatically presented with the advanced user engagement content at a later point, he may be eager to immediately learn more about the feature. As such, Heathcliff may be presented with a link in the help menu that states "you have completed this walkthrough, you may also be interested in other user engagement content as well." Upon clicking or tapping the link Heathcliff may be presented with the other user engagement content.

In some implementations, a user may receive achievements in a learning platform based on his or her engagement with user engagement content. By way of example, after completing a particular walkthrough, Nelly may be rewarded with an achievement in a learning platform such as Trailhead®.

Also or alternatively, the frequency at which users are presented with user engagement content can be adaptive per user. By way of example, Nelly may log into the application or service once or twice a week and get her work done quickly; therefore, showing her too much user engagement content may not be desirable. On the other hand, Heathcliff may log into the application or service every day; therefore, frequently showing him user engagement content may enhance his experience in interacting with the application or service.

In some implementations, an authorized administrator may disable all user engagement content that meets certain criteria. By way of example, an administrator may choose to disable all user engagement content created a certain number of years ago. Also or alternatively, user engagement content can be configured to automatically be deleted if certain criteria are met. By way of illustration, user engagement content may be configured to exist for a single version of the application or service, and when a new version of the application or service is released the user engagement content may be automatically deleted.

Also or alternatively, user engagement content may be provided to a user to inform him or her about a new version of an application or service. By way of example, Nelly may be interacting with a dashboard in a classic version of a salesforce platform. When interacting with the classic dashboard, Nelly may be presented with a prompt informing her of a new and improved dashboard in Lightning Experience®. Nelly may be given the option to navigate to the new and improved dashboard in Lightning Experience® at which point she may be automatically presented with a training video explaining the new and improved dashboard.

In some implementations, a user may "snooze" user engagement content. By way of example, at 4 P.M. on a Friday, Nelly may be presented with a long video explaining a new feature of a CRM platform. Nelly is tired and would rather view the video when she is rested after the weekend. As such, when presented with the video, Nelly may click or tap a button to snooze the video until Monday. Such a snooze effect may be configured to last for any time period such as a minute, two hours, a day, a week, etc. Also or alternatively, a snooze effect may be configured to last until the occurrence of a certain event, e.g., the next time a user logs into the application or service.

In some implementations, a user's progress with user engagement content can be tracked and used to inform his or her certifications. By way of example, Linton may complete ten walkthroughs relating to creating dashboards in the CRM platform. After Linton completes each walkthrough, data indicating that Linton has completed each walkthrough may be stored in a database. Several months may pass, after which point a new "Dashboard Creator" certification may be instituted. The Dashboard Creator certification may require completion of the ten walkthroughs that Linton has completed. Since data indicating that Linton has completed each of the ten walkthroughs has been stored, Linton may be automatically awarded with the Dashboard creator certification, avoiding the need for Linton to go back and re-complete the walkthroughs.

Also or alternatively, if someone leaves employment at a particular organization and becomes an employee of a new organization, records of his or her engagement with user engagement content can be stored and made available to the new organization. As such, he or she may not be presented with redundant user engagement content when he or she begins employment at the new organization.

Figure 8:
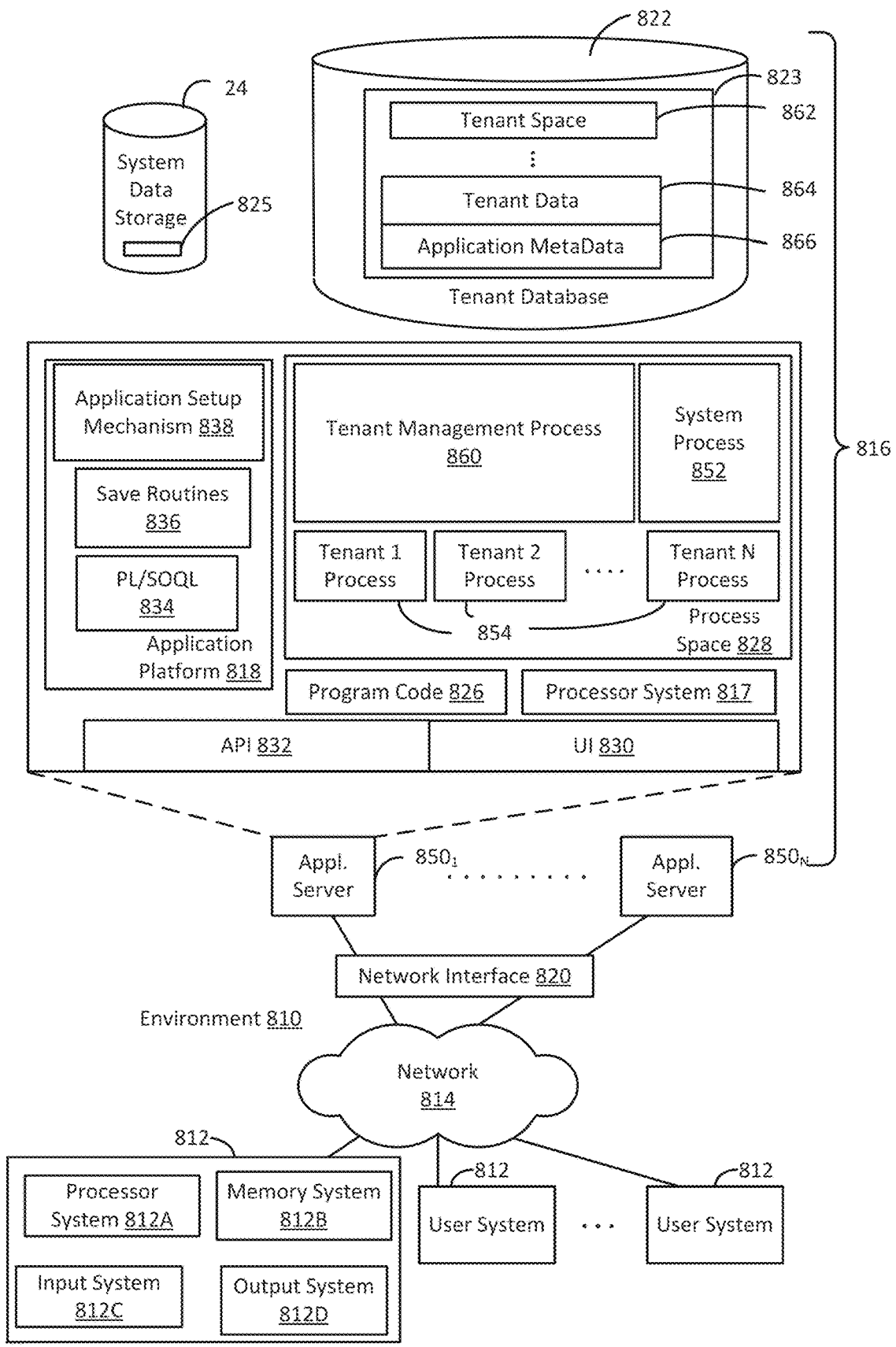
FIG. 8 shows a block diagram of an example of an environment that includes an on-demand database service configured in accordance with some implementations.

FIG. 8 shows a block diagram of an example of an environment 810 that includes an on-demand database service configured in accordance with some implementations. Environment 810 may include user systems 812, network 814, database system 816, processor system 817, application platform 818, network interface 820, tenant data storage 822, tenant data 823, system data storage 824, system data 825, program code 826, process space 828, User Interface (UI) 830, Application Program Interface (API) 832, PL/SOQL 834, save routines 836, application setup mechanism 838, application servers 850-1 through 850-N, system process space 852, tenant process spaces 854, tenant management process space 860, tenant storage space 862, user storage 864, and application metadata 866. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 816, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 816. Such applications may be developed by the database service provider or by users or third-party application developers accessing the service, Application platform 818 includes an application setup mechanism 838 that supports application developers' creation and management of applications, which may be saved as metadata into tenant data storage 822 by save routines 836 for execution by subscribers as one or more tenant process spaces 854 managed by tenant management process 860 for example. Invocations to such applications may be coded using PL/SOQL 834 that provides a programming language style interface extension to API 832. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 866 for a subscriber making such an invocation. Such system processes may also manage execution of application metadata 866 as an application in a virtual machine.

In some implementations, each application server 850 may handle requests for any user associated with any organization. A load balancing function (e.g., an F5 Big-IP load balancer) may distribute requests to the application servers 850 based on an algorithm such as least-connections, round robin, observed response time, etc, Each application server 850 may be configured to communicate with tenant data storage 822 and the tenant data 823 therein, and system data storage 824 and the system data 825 therein to serve requests of user systems 812. The tenant data 823 may be divided into individual tenant storage spaces 862, which can be either a physical arrangement and/or a logical arrangement of data. Within each tenant storage space 862, user storage 864 and application metadata 866 may be similarly allocated for each user. For example, a copy of a user's most recently used (MRU) items might be stored to user storage 864. Similarly, a copy of MRU items for an entire tenant organization may be stored to tenant storage space 862. A UI 830 provides a user interface and an API 832 provides an application programming interface to system 816 resident processes to users and/or developers at user systems 812.

System 816 may implement a web-based system associated with any kind of application or service, such as a CRM system. For example, in some implementations, system 816 may include application servers configured to implement and execute CRM-related software applications. The application servers may be configured to provide related data, code, forms, web pages and other information to and from user systems 812. Additionally, the application servers may be configured to store information to, and retrieve information from a database system. Such information may include related data, objects, and/or Webpage content. With a multi-tenant system, data for multiple tenants may be stored in the same physical database object in tenant data storage 822, however, tenant data may be arranged in the storage medium(s) of tenant data storage 822 so that data of one tenant is kept logically separate from that of other tenants. In such a scheme, one tenant may not access another tenant's data, unless such data is expressly shared.

Several elements in the system shown in FIG. 8 include conventional, well-known elements that are explained only briefly here. For example, user system 812 may include processor system 812A, memory system 812B, input system 812C, and output system 812D. A user system 812 may be implemented as any computing device(s) or other data processing apparatus such as a mobile phone, laptop computer, tablet, desktop computer, or network of computing devices, User system 12 may run an Internet browser allowing a user (e.g., a subscriber of an MTS) of user system 812 to access, process and view information, pages and applications available from system 816 over network 814. Network 814 may be any network or combination of networks of devices that communicate with one another, such as any one or any combination of a LAN (local area network), WAN (wide area network), wireless network, or other appropriate configuration.

The users of user systems 812 may differ in their respective capacities, and the capacity of a particular user system 812 to access information may be determined at least in part by "permissions" of the particular user system 812. As discussed herein, permissions generally govern access to computing resources such as data objects, components, and other entities of a computing system, such as a social networking system and/or a CRM database system. "Permission sets" generally refer to groups of permissions that may be assigned to users of such a computing environment. For instance, the assignments of users and permission sets may be stored in one or more databases of System 816. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 816 may provide on-demand database service to user systems 812 using an MTS arrangement. By way of example, one tenant organization may be a company that employs a sales force where each salesperson uses system 816 to manage their sales process. Thus, a user in such an organization may maintain contact data, leads data, customer follow-up data, performance data, goals and progress data, etc., all applicable to that user's personal sales process (e.g., in tenant data storage 822). In this arrangement, a user may manage his or her sales efforts and cycles from a variety of devices, since relevant data and applications to interact with (e.g., access, view, modify, report, transmit, calculate, etc.) such data may be maintained and accessed by any user system 812 having network access.

When implemented in an MTS arrangement, system 816 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 816 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 816 may also maintain system-level data usable by multiple tenants or other data. Such system-level data may include industry reports, news, postings, and the like that are sharable between tenant organizations.

In some implementations, user systems 812 may be client systems communicating with application servers 850 to request and update system-level and tenant-level data from system 816. By way of example, user systems 812 may send one or more queries requesting data of a database maintained in tenant data storage 822 and/or system data storage 824. An application server 850 of system 816 may automatically generate one or more SQL statements (e.g., one or more SQL queries) that are designed to access the requested data. System data storage 824 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 9A:
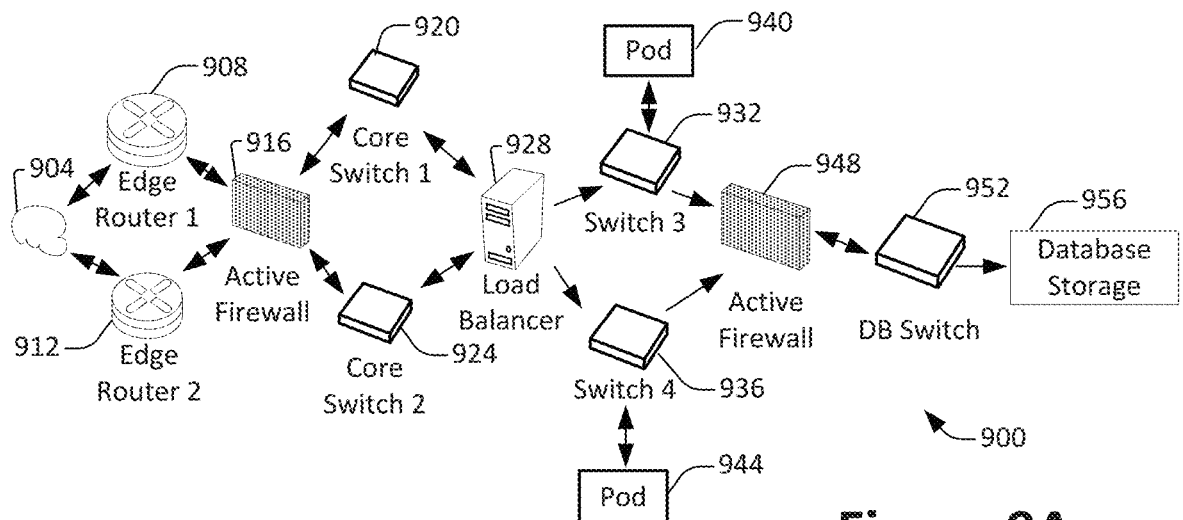
FIG. 9A shows a system diagram of an example of architectural components of an on-demand database service environment, configured in accordance with some implementations.

FIG. 9A shows a system diagram of an example of architectural components of an on-demand database service environment 900, configured in accordance with some implementations. A client machine located in the cloud 904 may communicate with the on-demand database service environment via one or more edge routers 908 and 912. A client machine may include any of the examples of user systems 812 described above. The edge routers 908 and 912 may communicate with one or more core switches 920 and 924 via firewall 916. The core switches may communicate with a load balancer 928, which may distribute server load over different pods, such as the pods 940 and 944 by communication via pod switches 932 and 936. The pods 940 and 944, which may each include one or more servers and/or other computing resources, may perform data processing and other operations used to provide on-demand services. Components of the environment may communicate with a database storage 956 via a database firewall 948 and a database switch 952.

Accessing an on-demand database service environment may involve communications transmitted among a variety of different components. The environment 900 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 9A and 9B.

The cloud 904 refers to any suitable data network or combination of data networks, which may include the Internet. Client machines located in the cloud 904 may communicate with the on-demand database service environment 900 to access services provided by the on-demand database service environment 900. By way of example, client machines may access the on-demand database service environment 900 to retrieve, store, edit, and/or process CRM information, information relating to user engagement content, or information relating to any kind of application or service.

In some implementations, the edge routers 908 and 912 route packets between the cloud 904 and other components of the on-demand database service environment 900. The edge routers 908 and 912 may employ the Border Gateway Protocol (BGP). The edge routers 908 and 912 may maintain a table of IP networks or 'prefixes', which designate network reachability among autonomous systems on the Internet.

In one or more implementations, the firewall 916 may protect the inner components of the environment 900 from Internet traffic. The firewall 916 may block, permit, or deny access to the inner components of the on-demand database service environment 900 based upon a set of rules and/or other criteria. The firewall 916 may act as one or more of a packet filter, an application gateway, a stateful filter, a proxy server, or any other type of firewall.

In some implementations, the core switches 920 and 924 may be high-capacity switches that transfer packets within the environment 900. The core switches 920 and 924 may be configured as network bridges that quickly route data between different components within the on-demand database service environment. The use of two or more core switches 920 and 924 may provide redundancy and/or reduced latency.

In some implementations, communication between the pods 940 and 944 may be conducted via the pod switches 932 and 936. The pod switches 932 and 936 may facilitate communication between the pods 940 and 944 and client machines, for example via core switches 920 and 924, Also or alternatively, the pod switches 932 and 936 may facilitate communication between the pods 940 and 944 and the database storage 956. The load balancer 928 may distribute workload between the pods, which may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948, which may act as a computer application firewall operating at the database application layer of a protocol stack. The database firewall 948 may protect the database storage 956 from application attacks such as structure query language (SQL) injection, database rootkits, and unauthorized information disclosure. The database firewall 948 may include a host using one or more forms of reverse proxy services to proxy traffic before passing it to a gateway router and/or may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, the database storage 956 may be an on-demand database system shared by many different organizations. The on-demand database service may employ a single-tenant approach, a multi-tenant approach, a virtualized approach, or any other type of database approach. Communication with the database storage 956 may be conducted via the database switch 952. The database storage 956 may include various software components for handling database queries. Accordingly, the database switch 952 may direct database queries transmitted by other components of the environment (e.g., the pods 940 and 944) to the correct components within the database storage 956.

Figure 9B:
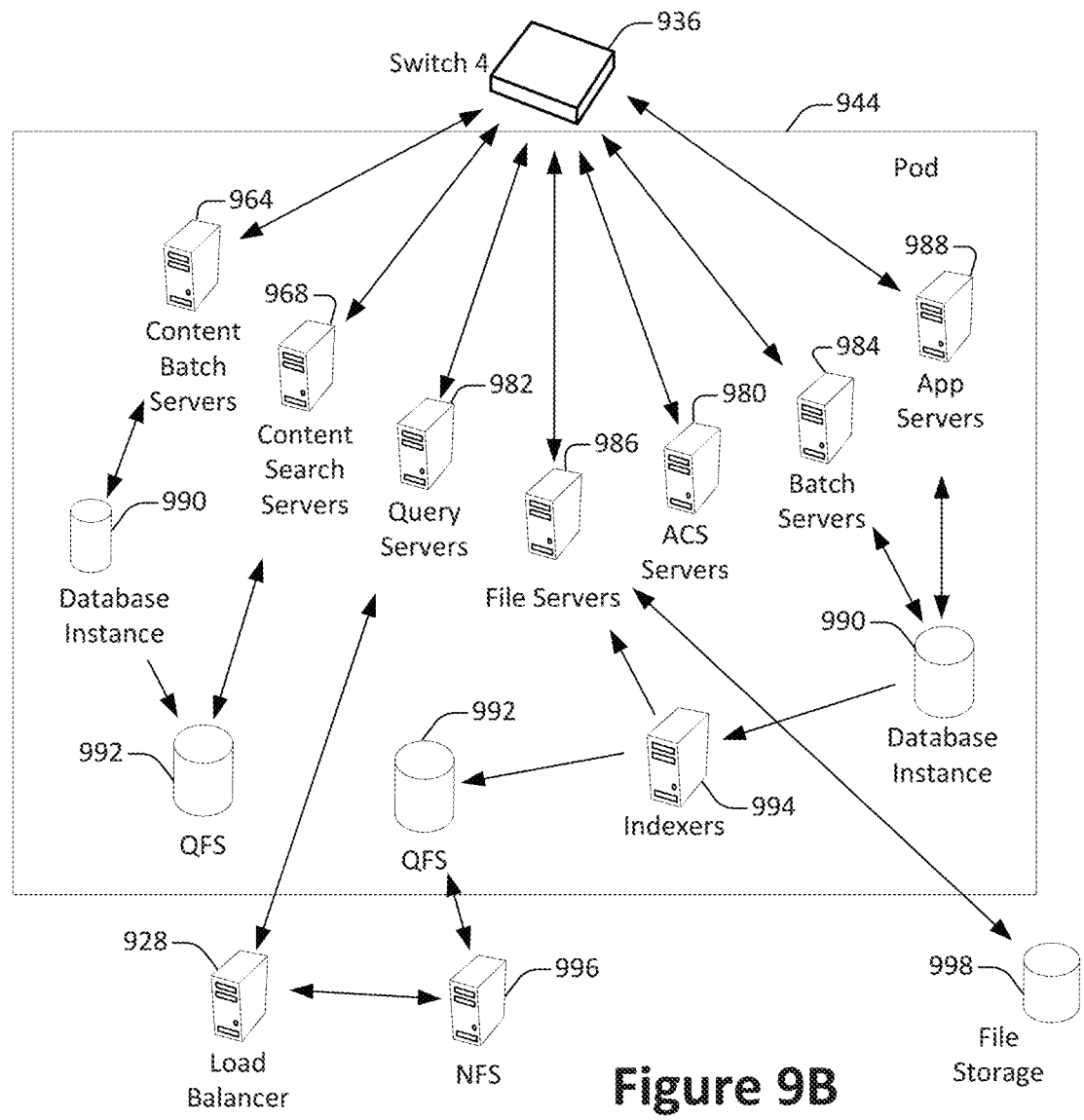
FIG. 9B shows a system diagram further illustrating an example of architectural components of an on-demand database service environment, in accordance with some implementations.

FIG. 9B shows a system diagram further illustrating an example of architectural components of an on-demand database service environment, in accordance with some implementations. The pod 944 may be used to render services to user(s) of the on-demand database service environment 900. The pod 944 may include one or more content batch servers 964, content search servers 968, query servers 982, file servers 986, access control system (ACS) servers 980, batch servers 984, and app servers 988. Also, the pod 944 may include database instances 990, quick file systems (QFS) 992, and indexers 994. Some or all communication between the servers in the pod 944 may be transmitted via the switch 936.

In some implementations, the app servers 988 may include a framework dedicated to the execution of procedures (e.g., programs, routines, scripts) for supporting the construction of applications provided by the on-demand database service environment 900 via the pod 944. One or more instances of the app server 988 may be configured to execute all or a portion of the operations of the services described herein.

In some implementations, as discussed above, the pod 944 may include one or more database instances 990. A database instance 990 may be configured as an MTS in which different organizations share access to the same database, using the techniques described above. Database information may be transmitted to the indexer 994, which may provide an index of information available in the database 990 to file servers 986. The QFS 992 or other suitable filesystem may serve as a rapid-access file system for storing and accessing information available within the pod 944. The QFS 992 may support volume management capabilities, allowing many disks to be grouped together into a file system. The QFS 992 may communicate with the database instances 990, content search servers 968 and/or indexers 994 to identify, retrieve, move, and/or update data stored in the network file systems (NFS) 996 and/or other storage systems.

In some implementations, one or more query servers 982 may communicate with the NFS 996 to retrieve and/or update information stored outside of the pod 944. The NFS 996 may allow servers located in the pod 944 to access information over a network in a manner similar to how local storage is accessed. Queries from the query servers 922 may be transmitted to the NFS 996 via the load balancer 928, which may distribute resource requests over various resources available in the on-demand database service environment 900. The NFS 996 may also communicate with the QFS 992 to update the information stored on the NFS 996 and/or to provide information to the QFS 992 for use by servers located within the pod 944.

In some implementations, the content batch servers 964 may handle requests internal to the pod 944. These requests may be long-running and/or not tied to a particular customer, such as requests related to log mining, cleanup work, and maintenance tasks. The content search servers 968 may provide query and indexer functions such as functions allowing users to search through content stored in the on-demand database service environment 900. The file servers 986 may manage requests for information stored in the file storage 998, which may store information such as documents, images, basic large objects (BLOBs), etc. The query servers 982 may be used to retrieve information from one or more file systems. For example, the query system 982 may receive requests for information from the app servers 988 and then transmit information queries to the NFS 996 located outside the pod 944. The ACS servers 980 may control access to data, hardware resources, or software resources called upon to render services provided by the pod 944. The batch servers 984 may process batch jobs, which are used to run tasks at specified times. Thus, the batch servers 984 may transmit instructions to other servers, such as the app servers 988, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 10:
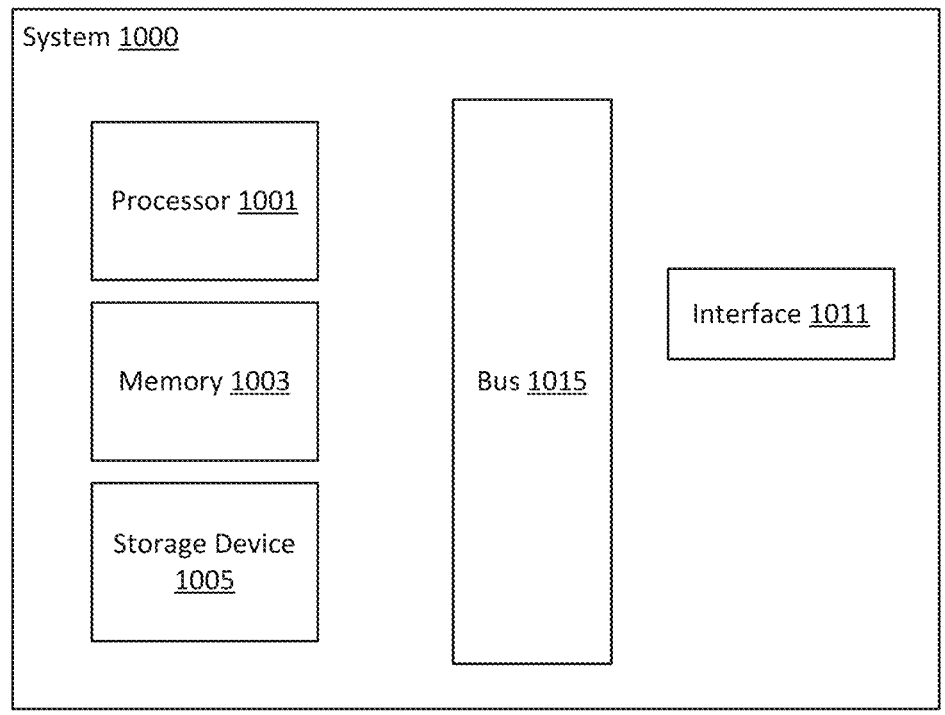
FIG. 10 illustrates one example of a computing device, configured in accordance with one or more embodiments.

FIG. 10 illustrates one example of a computing device. According to various embodiments, a system 1000 suitable for implementing embodiments described herein includes a processor 1001, a memory module 1003, a storage device 1005, an interface 1011, and a bus 1015 (e.g., a PCI bus or other interconnection fabric.) System 1000 may operate as variety of devices such as an application server, a database server, or any other device or service described herein. Although a particular configuration is described, a variety of alternative configurations are possible. The processor 1001 may perform operations such as those described herein. Instructions for performing such operations may be embodied in the memory 1003, on one or more non-transitory computer readable media, or on some other storage device. Various specially configured devices can also be used in place of or in addition to the processor 1001. The interface 1011 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two' entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MISS. However, the techniques of the present invention apply to a wide variety of computing environments. Particular embodiments may be implemented without some or ail of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A database system implemented using a server system comprising one or more hardware processors, the database system configurable to cause:
    maintaining a user engagement platform in association with an application or service, the user engagement platform being configurable to provide user engagement content to users of the application or service, the user engagement content comprising explanatory information illustrating one or more features of the application or service;
    generating, responsive to a request received from an authorized administrator, first user engagement content, the first user engagement content being configurable by the authorized administrator to be automatically provided to users of the application or service in response to occurrence of a first event in association with the users of the application or service;
    storing the first user engagement content in the database system;
    determining that the first event has occurred in association with a first user of the application or service;
    automatically selecting, based on a measurement of timing of consumption of designated user engagement content and subsequent use of a designated feature of the application or service, a timing of when to present the first user engagement content to the first user;
    causing display of, responsive to determining that the first event has occurred in association with the first user, the first user engagement content according to the timing on a device of the first user;
    determining that a second event has occurred in association with the first user of the application or service, the second event corresponding to provision of both second user engagement content and third user engagement content to the first user;
    determining that the second user engagement content has a higher priority than the third user engagement content; and
    responsive to determining that the second user engagement content has the higher priority than the third user engagement content, displaying, on the device of the first user, the second user engagement content prior to displaying the third user engagement content.

2. The database system of claim 1, the database system further configurable to cause: displaying, via a help menu on the device of the first user, a link configurable to allow the first user, upon selection of the link, to be presented with partially consumed user engagement content.

3. The database system of claim 1, wherein the first user engagement content comprises help menu content to assist the first user in using the application or service.

4. The database system of claim 1, the database system further configurable to cause: accessing information associated with behavior of the first user in a learning platform; and displaying, based on the information associated with the behavior of the first user in the learning platform, further user engagement content.

5. The database system of claim 1, the database system further configurable to cause: performing an operation on the first user engagement content, the operation comprising one or more of: retrieving the first user engagement content, deleting the first user engagement content or modifying the first user engagement content.

6. The database system of claim 1, wherein the application or service comprises a customer relationship management (CRM platform and/or a social networking system provided to a plurality of tenant organizations via an on-demand computing environment, the authorized administrator and the first user being associated with a first one of the tenant organizations, the first user engagement content being exclusively available to users associated with the first tenant organization.

7. The database system of claim 6, the timing being automatically selected based on data associated with a plurality of the tenant organizations.

8. The database system of claim 1, wherein user-specific metrics comprise one or more of: a measure of whether users engage with particular user engagement content, a measure of types of user engagement content the users engage with, a measure of a measure of how much time the users spend engaging with the particular user engagement content, a measure of how the users respond to different types and/or quantities the particular user engagement content, a measure of a type of device the users use to interact with the application or service, a measure of whether and how often the users interacts with a particular feature of the application or service, a measure of behavior of the users in an external learning platform, a full historical tracking of history of the users' engagement with the particular user engagement content, a record of types of user engagement content that have been presented to the users and measurements of effectiveness of each type of user engagement content, and/or a measurement of timing of consumption of particular user engagement content and subsequent use of a particular feature of the application or service.

9. A method for implementing a user engagement platform using a database system, the method comprising:
    maintaining a user engagement platform in association with an application or service, the user engagement platform being configurable to provide user engagement content to users of the application or service, the user engagement content comprising explanatory information illustrating one or more features of the application or service;

receiving a request, from an authorized administrator, to generate first user engagement content, the first user engagement content being configurable by the authorized administrator to be automatically provided to users of the application or service in response to occurrence of a first event in association with the users of the application or service;

storing, by one or more hardware processors, the first user engagement content in the database system;

determining that the first event has occurred in association with a first user of the application or service;

automatically selecting, based on a measurement of timing of consumption of designated user engagement content and subsequent use of a designated feature of the application or service, a timing of when to present the first user engagement content to the first user;

causing display of, responsive to determining that the first event has occurred in association with the first user, the first user engagement content according to the timing on a device of the first user;

determining that a second event has occurred in association with the first user of the application or service, the second event corresponding to provision of both second user engagement content and third user engagement content to the first user;

determining that the second user engagement content has a higher priority than the third user engagement content; and responsive to determining that the second user engagement content has the higher priority than the third user engagement content, displaying, on the device of the first user, the second user engagement content prior to displaying the third user engagement content.

10. The method of claim 9, the method further comprising: causing display of, via a help menu on the device of the first user, a link configurable to allow the first user, upon selection of the link, to be presented with partially consumed user engagement content.

11. The method of claim 9, wherein the first user engagement content comprises help menu content to assist the first user in using the application or service.

12. The method of claim 9, the method further comprising: accessing information associated with behavior of the first user in a learning platform; and causing display of, based on the information associated with the behavior of the first user in the learning platform, further user engagement content.

13. The method of claim 9, the method further comprising: performing an operation on the first user engagement content, the operation comprising one or more of: retrieving the first user engagement content, deleting the first user engagement content or modifying the first user engagement content.

14. The method of claim 9, wherein the application or service comprises a customer relationship management (CRM) platform and/or asocial networking system provided to a plurality of tenant organizations via an on-demand computing environment, the authorized administrator and the first user being associated with a first one of the tenant organizations, the first user engagement content being exclusively available to users associated with the first tenant organization.

15. A computer program product comprising a non-transitory computer-readable medium storing computer-readable program code capable of being executed by one or more processors, the computer-readable program code comprising instructions configurable to cause:

maintaining, using a database system, a user engagement platform in association with an application or service, the user engagement platform being configurable to provide user engagement content to users of the application or service, the user engagement content comprising explanatory information illustrating one or more features of the application or service;

generating, responsive to a request received from an authorized administrator, first user engagement content, the first user engagement content being configurable by the authorized administrator to be automatically provided to users of the application or service in response to occurrence of a first event in association with the users of the application or service;

storing the first user engagement content in the database system;

determining that the first event has occurred in association with a first user of the application or service;

automatically selecting, based on a measurement of timing of consumption of designated user engagement content and subsequent use of a designated feature of the application or service, a timing of when to present the first user engagement content to the first user;

causing display of, responsive to determining that the first event has occurred in association with the first user, the first user engagement content according to the timing on a device of the first user;

determining that a second event has occurred in association with the first user of the application or service, the second event corresponding to provision of both second user engagement content and third user engagement content to the first user;

determining that the second user engagement content has a higher priority than the third user engagement content; and responsive to determining that the second user engagement content has the higher priority than the third user engagement content, displaying, on the device of the first user, the second user engagement content prior to displaying the third user engagement content.

16. The computer program product of claim 15, the instructions further configurable to cause: displaying, via a help menu on the device of the first user, a link configurable to allow the first user, upon selection of the link, to be presented with partially consumed user engagement content.

\* \* \* \* \*